United States Patent

Magladry

[15] 3,644,173

[45] Feb. 22, 1972

[54] NUCLEAR REACTOR OF THE METAL HYDRIDE CONTROL TYPE

[72] Inventor: Robert E. Magladry, Baltimore, Md.

[73] Assignee: Teledyne, Inc., Los Angeles, Calif.

[22] Filed: Nov. 6, 1967

[21] Appl. No.: 680,618

[52] U.S. Cl. ...................................176/42, 176/19, 176/22, 176/69
[51] Int. Cl. .........................................................G21c 7/00
[58] Field of Search ...................................176/42, 69, 20, 21

[56] References Cited

UNITED STATES PATENTS 3,164,525 1/1965 Wetch et al............................176/42 X
3,285,822 11/1966 Ackroyd.................................176/42 X

FOREIGN PATENTS OR APPLICATIONS 963,161 7/1964 Great Britain.............................176/42

Primary Examiner—Reuben Epstein
Attorney—Fleit, Gipple & Jacobson

[57] ABSTRACT

A nuclear reactor comprising thermally isolated first and second sealed containers carrying metal hydride, one of which also includes nuclear fuel material with the metal hydride material forming essentially the reactor core, circulating coolant passages through the core containing container means for fluid connecting the sealed containers to allow intercontainer transfer of released hydrogen and means for heating the nonreactor core container to control reactivity within the reactor core.

21 Claims, 6 Drawing Figures

INVENTOR.
ROBERT E. MAGLADRY

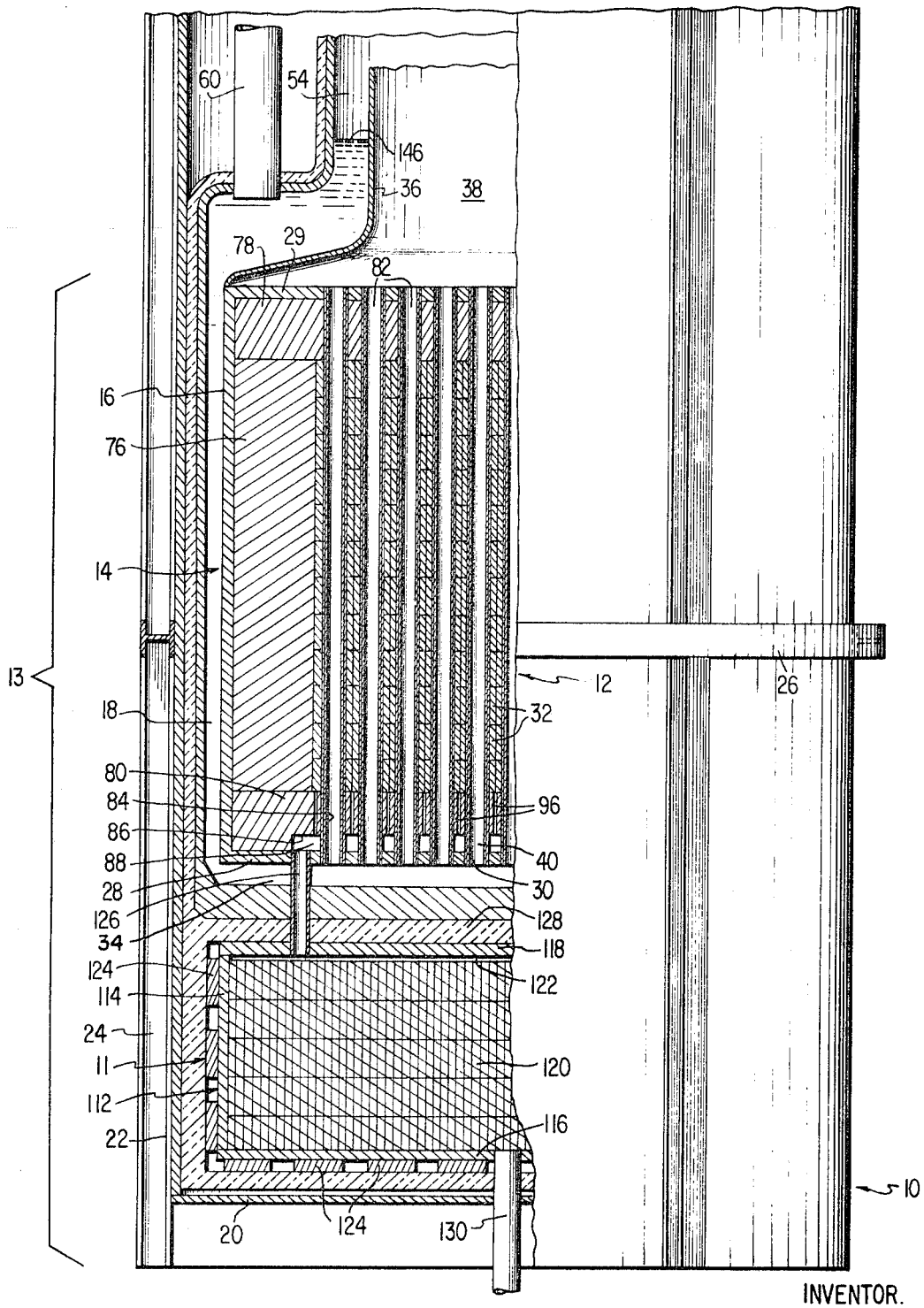
FIG. IB

INVENTOR
ROBERT E. MAGLADRY

BY Sughrue, Rothwell, Mion, Zinn & Macpeak
ATTORNEYS

NUCLEAR REACTOR OF THE METAL HYDRIDE CONTROL TYPE

CROSS-REFERENCES TO RELATED APPLICATIONS

This application relates to copending applications Ser. No. 520,824 by Robert Magladry filed Jan. 3, 1966 entitled "Hydrogen Diffusion Reactivity Control", now U.S. Pat. 3,351,534, Ser. No. 594,415 by Robert Magladry et al. filed Nov. 15, 1966 entitled "Porous Metal Hydride Bodies", and Ser. No. 508,451 by Robert Magladry filed Nov. 18, 1965 entitled "Nuclear Thermoelectric Power Plant."

BACKGROUND OF THE INVENTION

1. Field of the Invention

The invention pertains to the nuclear reactor field, and more particularly to compact, spatial and terrestrial reactors, particularly those employed as heat sources for thermoelectric generators.

2. Description of the Prior Art

In the nuclear reactor field, and especially in the area of nuclear-reactor-powered electrical generators, a completely passive system for regulating and controlling the nuclear reactions has been recently developed. This method of control and regulation is set forth in copending application Ser. No. 520,824, previously referred to. The self-regulating, mechanically passive control system, in its conceptual form, involves reactor fuel within the core of the reactor which is in operative relationship with a first portion of hydride material, while a second portion of hydride material is positioned exteriorly of the core. The rod or other means carrying the spaced portions of hydride material includes means for allowing the migration of hydrogen between the two hydride portions. The core portion of hydride material is subject to nuclear heat, while the external hydride material is provided with means, such as an electrical heating coil for heating the same and producing a desired temperature differential between portions of hydride material. The hydrogen concentration within respective sections of the hydride material is thus varied to achieve a desired control function. The internal portion of hydride material, which may be one end of a unitary control rod, may also serve as a reactor fuel carrier. The response characteristic of the control system can be enhanced by utilizing porous hydride bodies by providing hydrogen flow channels within the for and/or by providing internal and external hydride bodies connected by a flow channel.

For low-power reactors, there is sufficient removal of heat by conduction, etc. However, for reactors of higher power, the heat must be removed from the reactor by a coolant, which coolant directs the thermal energy to a static electrical converter or generator, for instance, of the thermoelectric type. The susceptibility of thermoelectric materials to radiation damage has resulted in the development of a thermal energy transfer system employing the use of a boiling-condensing fluid which is compatible to both the thermoelectric material and to the nuclear power source and which may be readily applied in a closed loop to a gravity oriented, nuclear-powered thermoelectric generator. Such a power plant employing teraphosphorous trisulfide as the vaporizible liquid, is set forth in the referred to application Ser. No. 508,451, entitled "Nuclear Thermoelectric Power Plant".

The present invention is directed to a nuclear reactor powered thermoelectric generator of the gravity oriented type which employs both the passive metal hydride reactor control system and the boiling-condensing thermal energy transfer means of the referred to applications. The power plant makes use of the metal hydride as the control means within the reactor section, which may have incorporated therein either distributed fuel where the power density of the fuel is relatively low, or hydride moderators without fuel but allowing the fuel to be carried within the metal hydride material in either rod or tubular form. Further, in a preferred embodiment of the present invention, there is provided a separate container of fueled hydride material forming the reactor core and non-fueled hydride material acting as a reservoir which is separate and distinct from the reactor section but is fluid coupled by one or more connecting tubes, allowing ready passage of disassociated hydrogen between the containers in response to temperature differential.

SUMMARY OF THE INVENTION

The invention relates to a nuclear reactor of the passive metal hydride control type and comprises basically thermally isolated first and second sealed containers with the first container carrying both the metal hydride and nuclear fuel material, with the metal hydride material forming essentially the reactor core. Coolant passages are provided within the metal hydride core material and coolant is circulated through the first container, preferably delivering thermal energy to an associated thermoelectric generator. The second container contains essentially only the metal hydride material and one or more tubes coupled between the containers allow disassociated hydrogen to pass therebetween. Electrical heating elements surround the second container to control reactivity within the reactor core. In a preferred form, a plurality of spaced, longitudinally extending metal tubes allow passage of the circulating coolant to the first container, but out of physical contact with the metal hydride core material. Pellets of metal hydride material having central apertures are positioned on the tubes in the form of a plurality of laterally adjacent series of axially aligned abutting elements, the pellets preferably being hexagonal in cross-sectional configuration and having small diameter axial passages for dispersing the hydrogen within the pellets and radial passages carried by the pellets along one end face which intersect with the axial dispersion passages. The reactor fuel may be uniformly carried by the metal hydride core material or alternatively, the nuclear fuel may consist of a doughnut-shaped tube positioned within the aperture of each pellet with the fuel tube carrying the coolant passage tube; or alternatively, the fuel material may be in solid rod form and positioned centrally of the coolant tube.

BRIEF DESCRIPTION OF THE DRAWINGS

FIG. 1B is a side view, partially in section, of the bottom portion of the assembly of FIG. 1A, housing the nuclear reactor section.

DESCRIPTION OF THE PREFERRED EMBODIMENTS

Figure 1A:
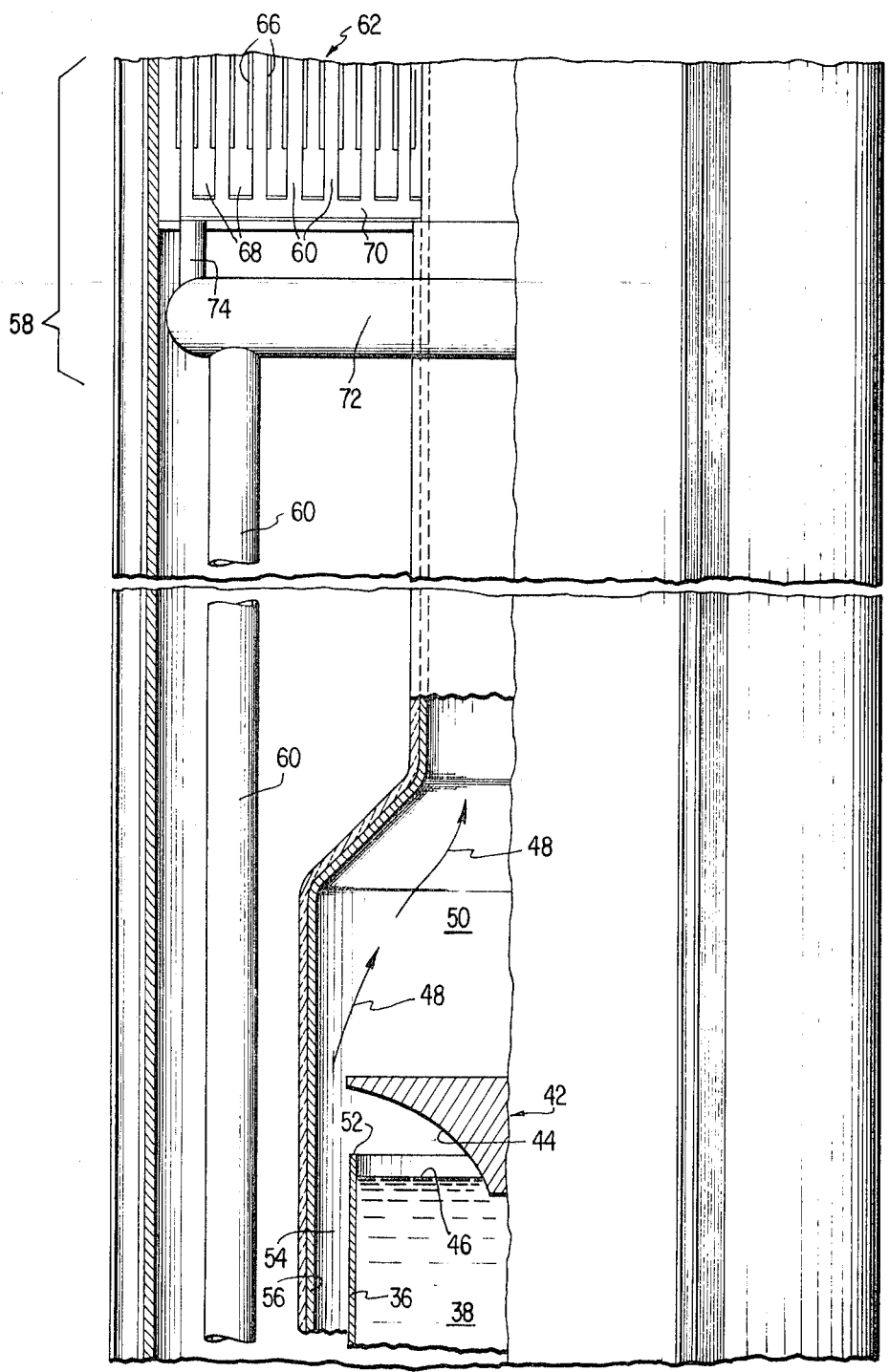
FIG. 1A is a side elevation view, partially in section, of the top portion of the metal hydride controlled, nuclear-powered, gravity-oriented thermoelectric generator assembly of the present invention incorporating the thermoelectric generator and the condenser section of the gravity oriented, evaporating-condensing thermal energy transfer system.

In contrast to the basic metal hydride reactor design, as set forth in the referred to application Ser. No. 520,824 the present metal hydride controlled reactor of this application, in a preferred form, employs uranium zirconium hydride in pellet form, as the entire core and in which the pellets carry tubes or other flow channels for the reactor coolant. While this concept is basic to the present invention, in alternate embodiments, fuel, in the form of separate elements, may be carried by the metal hydride core, preferably, within or in contact with the coolant passage. If the power density of the fuel is relatively low, the present reactor design makes use of a core formed entirely of the fuel material and its moderator. Because the power level of the reactor is low, heat may be conducted with relative ease from the fuel. However, if the density is high and the amount of fuel required is small, then the fraction of the core which needs to be occupied by space or coolant flow is large and fuel in the form of rods or tubes is positioned within the pellet coolant passage.

Further reference to the basic metal hydride controlled reactor design indicates that in a preferred embodiment, fuel is incorporated with the zirconium hydride within the end of the metal hydride rod carried by the reactor core. In this case each rod carries its own fuel and the end of the rod protruding from the core acts as an individual metal hydride reservoir for the core end of the rod on a one-to-one basis. With the employment of phosphorous sulphur coolant, as set forth in the referred to application Ser. No. 508,451, if a situation should arise in which some hydrogen leaks from the rod into the coolant, it will not, at the temperatures and pressures under normal operation, react in an adverse manner with the phosphorous and sulphur. While such an incident may interfere somewhat with the proper operation of the system, it would not result in the generation of high pressures and subsequent rupture of the coolant system, etc. As a result, it is no longer necessary to compartmentalize the core and reservoir sections in the form of a plurality of individual rods, etc., and the present invention is directed to the concept employing a single core formed totally of hydride material, fueled or otherwise, and a second hydride portion, in a single reservoir, every part of which is able to communicate with every other part. The obvious advantage of this concept is that hydrogen can redistribute itself according to temperature distribution within the core. In general, the hydrogen concentration will be higher in those areas in which the temperature is lower. The presence of hydrogen in turn increases the amount of power which is produced in that particular region so the effect of permitting hydrogen to spread throughout the core, according to temperature distribution, tends to make the power distribution more uniform. This is a further advantage, since the more uniform the power distribution, the more efficiently the heat is removed from the core by its coolant. Flat power distribution allows the coolant tubes to be spread uniformly throughout the core. Obviously, if power distribution were not uniform, optimum design would require compensated tube distribution throughout the core. Uniform distribution also makes for more uniform burnup of the fuel and hence, more effective use of the fuel.

Referring now to the drawings, FIG. 1B shows that portion of the nuclear powered generator assembly 10 which houses the nuclear reactor section and the metal hydride reservoir 11. The nuclear reactor core, indicated generally at 12, comprises a cylindrical container or can 14 formed of metal. Since the outer surface 16 of the can side must be compatible with the coolant carried within a coolant passage 18, the material may be stainless steel, or an alloy of zirconium, for instance, if the coolant happens to be composed of phosphorous and sulphur. The assembly 10 is generally cylindrical in form, being gravity oriented with the end face 20 forming the bottom of the assembly. A tubular sidewall 22 extends upwardly from the bottom 20, the sidewall being reinforced by axially extending beam members 24 which are coupled to a number of annular beams 26 at spaced points along the length of the assembly.

The can 14 which carries the nuclear reactor core is provided with bottom end wall 28 and top end wall 29 with the can 14 having a length roughly the same as its diameter. Penetrating the can from one end wall 28 to the other 29 are a series of spaced coolant tubes 30 which could be formed of zirconium or like metal and covered on the outside with some glass, ceramic or enamel material, facing the zirconium pellets 32, which acts to prevent the migration of hydrogen through the tube wall and into the coolant, flowing internally of tubes 30 with passage 40. The space adjacent the outside of end wall 28 acts as a header 34 for the $P_4S_3$ coolant, while the endwall 29 forms, in conjunction with metal dividing wall 36, a rather large coolant riser passage 38. The tubes 30 may be made of some metallic material, other than zirconium, but the metal must have inherently low hydrogen permeation rates. Materials, such as beryllium or molybdenum are suitable. These materials prevent a significant loss of hydrogen from the metal hydride control system, which through permeation might escape into the coolant provided the walls were thin enough. The general coolant flow direction is down, around the outside of the can 14 within annular channel 18 and across the bottom face of the can, within header passage 34, up through the individual coolant passages 40 formed by the tubes 30 and into a rather large passage 38, called a riser or a chimney. The chimney passage 38 terminates at some level above the core section 12 and in the customary boiling type of core, there is sufficient liquid coolant such that the liquid level is maintained within the chimney 38 somewhere in the vicinity of a moisture separator 42 (FIG. 1A). Along the top of the riser or chimney 36, the vapor breaks from the liquid phase and carries with it a certain amount of occluded moisture which hits the curved face 44 of the moisture separator and drips back onto the boiling surface. During normal operation, the level of the liquid is at the top of the riser passage 38, as indicated by line 46. The vapor passes upwardly through vapor channel 50, beyond the moisture separator 42, as indicated by the arrows 48. Some of the liquid spills over the edge 52 of the riser and runs down channel 54, formed by a double plate wall 56, where it passes into annular channel 18 in the vicinity of core 12. The passage 54 acts as a recirculation loop for the nonvaporized liquid. However, the vaporized liquid which condenses within the thermoelectric generator section 58 of the assembly returns to the annular passage 18 through condensation return tube 60. The vapor which moves upwardly within channel 50 is selectively directed to a conventional thermoelectric generator or thermoelectric energy converter assembly 62. It condenses within vertical passages 60 and gives up its latent heat to the thermoelectric generator elements, indicated at 66, carried by the spaced support members 68. The condensate then flows down into condenser header 70 and passes into a plenum chamber 72 through vertical tube 74, whereupon the collected liquid condensate falls by gravity through vertical condenser return tube 60 to the annular passage 18 in the vicinity of the core. The bottom of tube 60 opens up into the recirculation space or channel 54.

The thermoelectric generator itself and the use of an evaporation-condensation vaporizable liquid as a means for removing thermal energy from a nuclear reactor and carrying the same to a heat exchanger or a thermoelectric converter is basically set forth in the referred to application Ser. No. 508,451 entitled "Nuclear Thermoelectric Power Plant". Further, while the coolant in the present assembly is preferably a composition of phosphorous and sulfur, it is obvious that other coolants are readily acceptable substitutes, such as potassium or water.

Referring again to the reactor core 12 (FIG. 1B), the can 14 is lined with suitable neutron reflecting material. In this respect, an annular reflector 76 cooperates with perforated circular reflector end plates 78 and 80 of thorium or some other suitable neutron reflecting material. The plate 78 at the top of the can is suitably perforated at 82 to receive one end of the coolant pipes 30, while the bottom plate 80 is perforated at 84 for the same reason. Plate 80 is also recessed at 86 to form a thin circular hydrogen header 88. The thorium reflecting plate 80 is also perforated with in-line channel 96 which extend through the plate to allow hydrogen to flow, reversibly from the hydrogen header 88 to the axially aligned, edge abutting zirconium hydride pellets 32 carried by the coolant tubes 30.

Figure 2:
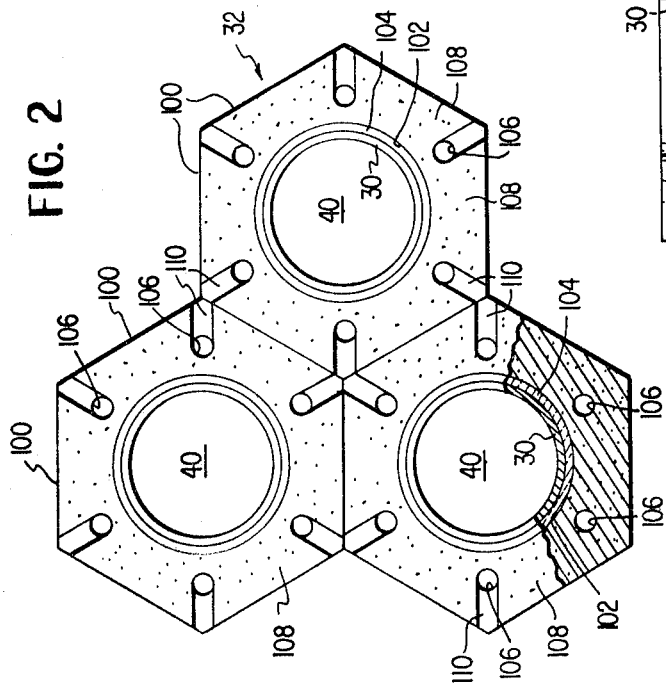
FIG. 2 is a plan view, partially in section, of a number of the fueled metal hydride pellets forming completely, the core of the nuclear reactor section of the assembly.

Referring to FIG. 2, the complete reactor core for the assembly of FIGS. 1A and 1B involves the use of plurality of axially aligned, abutting metal hydride pellets 32 which are preferably hexagonal in cross section, made of porous zirconium uranium hydride, with the individual particles making up the pellets preferably spherical. The pellets 32 are provided with a hexagonal side 100 and a cylindrical internal bore 102 which is of a diameter on the order of the coated coolant tubes 30. The coolant tubes 30 are coated on the outside with a ceramic or glass layer 104. A plurality of small diameter holes 106 are formed longitudinally of each pellet between the inner and outer surfaces 102 and 100 to facilitate hydrogen diffusion into and out of the hydride material. Further, it is desirable to interconnect the various longitudinal passages 106, as well as to allow lateral diffusion of the hydrogen along the abutting end faces. In this respect, the end face 108 of each pellet is provided with surface recesses 110 which extend outwardly radially from each longitudinal passage 106. When the hexagonal pellets abut on tubes 30, as indicated in FIG. 2, hydrogen may move freely through the core of the reactor to ensure uniform hydriding. The pellets 32 are closely packed to form a somewhat solid core as readily indicated by FIG. 1B. The optimum number of longitudinal and radial holes within the individual pellets varies depending upon the porosity of the hydride material. The more space allowed for flow channels, the more responsive the system becomes since the distance the hydrogen has to move to permeate through the more porous material is shortened. It has been determined that normally for best operation, the hydride pellets should have on the order of 5–25 percent porosity with approximately 5 percent of the fuel and moderator space being occupied by the open channels 106 and 108. The longitudinal holes 106, the bores 102 receiving the coolant pipe and the radial recesses 110 are readily formed within the pellets during manufacture in a die press under conventional powdered metallury techniques.

Referring again to FIG. 1B, another important aspect of the present invention is the utilization of a metal hydride reservoir which is physically separated from the reactor core but which allows ready diffusion of all of the hydrogen carried thereby to the zirconium hydride reactor control pellets carried by the core 12. In this respect, a can or container 112 which may be also formed of stainless steel or zircalloy includes an annular sidewall 114, a bottom end wall 116 and a top end wall 118. The can preferably carries a plurality of unfueled porous zirconium hydride pellets 120 which may be hexagonal in cross-sectional configuration, of generally the same size, etc., and stacked in layers, in end abutting relationship. In contrast to the pellets 32 of the reactor core section, the pellets do not include a large central bore for coolant but may, however, include axial and radial holes (not shown) similar to passages 106 and 110 of the corresponding reactor core pellets 32, if desired. However, the zirconium hydride material itself may be sufficient to allow radial and axial diffusion of the hydrogen between the core and reservoir sections in response to temperature differentials to meet the design response requirement of the system. Adjacent end wall 118, there is provided a space in the form of a header or plenum 122 to assist hydrogen in diffusing to and from the hexagonal pellets 120. Surrounding the reservoir can 112 are a plurality of electrical heaters 124 which are suitably connected to a source of electrical energy and controlled by means (not shown), whereby heat may be readily applied to the zirconium hydride pellets 120 for selectively driving hydrogen from the reservoir 11 of the assembly to the reactor core 12. The passage of hydrogen is facilitated by one or more longitudinally extending pipes or metal conduits 126 which pass through the respective can walls 28 and 118 allowing hydrogen to readily move between the respective headers 88 and 122. Thermal insulation 128 surrounds the reactor core 12, the reservoir 11 and fills the space between plate 78 and the top wall 118 of the reservoir can. Since the control system operates as a result of a temperature differential between the hydride material within the core 12 of the reactor and exteriorly of the core, in reservoir 11, it is desirable to limit thermal energy transfer between these members. While there may be more than one hydrogen transfer pipe 126 between these two sections, additional pipes have adverse effect on the thermal gradient between the reservoir and the core since the pipes act as thermal conductors through the insulation layer 128. The primary motivation for using more than one pipe is purely structural since these elements may also provide the necessary support and separation of the reservoir from the core proper.

In the operation of the gravity-oriented reactor-powered generator assembly, the can 14 carrying the fueled zirconium hydride pellets and the reservoir can 112 carrying the non-fueled zirconium hydride pellet are assembled with one or more tubes 126 providing fluid connection between the two thermally isolated cans. Bottom wall 116 of the reservoir can 112 is provided with a hydrogen delivery tube 130 which may be formed of metal such as that used to form the reservoir can or other suitable material and which may be readily coupled to a source of hydrogen (not shown) for initially hydriding the zirconium hydride pellets 120 in can 112 and the fueled pellets 32 in the core section. The zirconium hydride pellets may be partially hydrided prior to assembly. However, after assembly in the sealed cans, hydrogen is delivered through the tube 130 and added to the system. Obviously, if the pressed and sintered pellets 32 and 120 are partially hydrided, it is necessary to ensure that there is not enough hydrogen in them prior to "startup" to make the assembly critical. The assembly comprising the cans 12 and 112 may be placed in a furnace, for instance, to bring the temperature of the assembly up to 1,500° F. more. It is necessary that the temperature be high enough that the zirconium hydride material becomes slightly plastic and then hydrogen is slowly emitted to the system through tube 130. The zirconium hydride pellets 32 and 120 absorb the hydrogen and in the process of hydration, the zirconium hydride expands physically. Insofar as the core section 12 is concerned, the expansion of the zirconium hydride enhances its heat transfer capability by providing a snug fit between the coolant tubes 30 and the pellets 32 which embrace the same. As the tubes are coated with glass on the outside, the expansion of the zirconium hydride material places the glass in compression. Since glass has poor tensile strength but high compression strength, this is acceptable.

Due to the concern for nuclear criticality, the quantity of hydrogen entering tube 130 must be accurately metered. The hydrogen can be emitted from containers of fixed size, with the size being precomputed to limit the amount of reactivity which would be associated with the given amount of hydrogen. The tube 130 may also be provided with a petcock or other valve means so that it could be turned off after a sufficient mass of hydrogen has been chemically absorbed by the zirconium hydride pellets, although the tube 30 may be simply pinched in the area of the container bottom wall 20 after filling or it can be welded close, since an on-off valve may lend itself to problems during use. In any case, after a precomputed mass of hydrogen has been chemically absorbed by the metal hydride material in both the core and reservoir sections, the reactor is brought to criticality by energizing the electrical heaters 124 surrounding the reservoir can 112. This creates a temperature differential between the core 12 and the reservoir 112, tending to drive hydrogen from the reservoir into the core. An increase in hydrogen concentration within the core hydride pellets 32 increases the level of reactivity within the reactor and therefore provides an increased power output to the thermoelectric converter section at the top of the assembly 10. The coolant boils off in the vicinity of the moisture separator and moves rapidly to the thermoelectric converter section 58 whereupon it condenses and returns through tube 60 to the core section. It is the physical difference in heads between the liquid level line 46 within riser 38 and the liquid level line 146 within passage 54 which causes coolant to continue to circulate through the coolant tubes 30 and achieves the necessary heat transfer from the reactor section 13 to the converter section 58.

Characteristically, the metal hydride control system is quite simple in operation. Reactivity control is provided by hydriding the reservoir to the desired degree. The reservoir 11 either absorbs or liberates hydrogen as required and the process is extremely rapid. Delivery of the hydrogen is facilitated by the employment of one or more tubes 126 and headers 88 and 122 within the respective core and reservoir. The solubility of hydrogen in zirconium or uranium zirconium alloy is dependent on temperature. The core must have a given amount of hydrogen in solid solution in order to achieve criticality. If the core overheats, hydrogen leaves the core and flows through the connecting pipe 126 to the reservoir where it is absorbed. When the core cools, hydrogen returns to the core from the reservoir. All that is required is that the reservoir be maintained at a constant temperature, this being achieved by the controlled energization of the electrical heaters 124. Beyond this restriction, the operation is completely automatic and passive. The reactor will operate at a constant temperature, which may be several hundred degrees lower than the reservoir temperature. The reactor may be shut down by merely turning off the reservoir heaters, since there is insufficient hydride within the core, in the absence of additional hydrogen delivery from the reservoir to achieve criticality. There is no built-in mechanical reactivity increment in the system and furthermore, the reactivity process is fail-safe.

Figure 3:
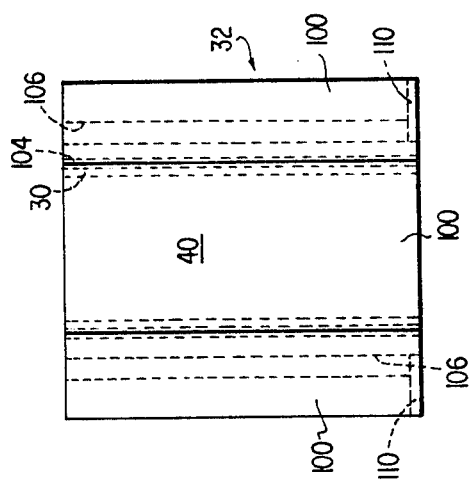
FIG. 3 is an elevational view of one of the pellets of FIG. 2.

The embodiment of FIGS. 1A and 1B employs fueled zirconium alloy pellets which are porous, being pressed and sintered prior to placement on the axially extending coolant tubes. The configuration of the fueled zirconium alloy pellets is shown in FIGS. 2 and 3. Alternate reactor core configurations involving essentially the zirconium alloy as the basic core material are shown in FIGS. 4 and 5.

Figure 4:
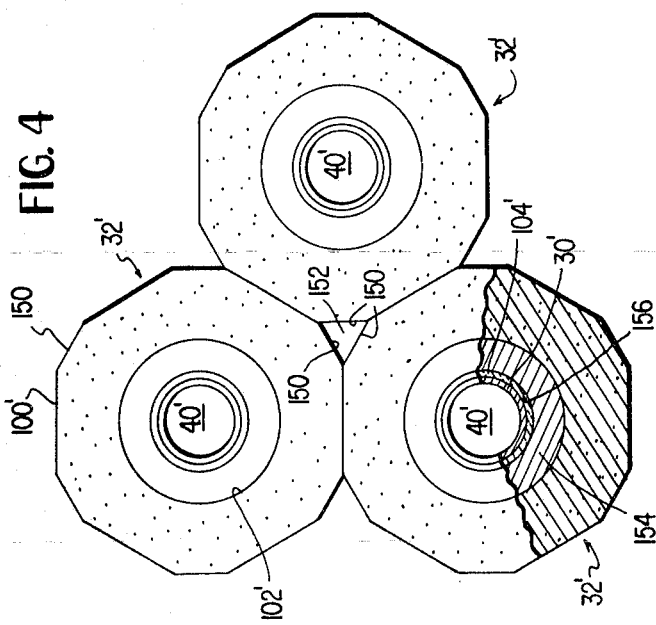
FIG. 4 is a plan view, partially in section, of a number of the passive metal hydride core pellets, in a modified form, of a nuclear reactor which may be employed in the assembly of the present invention.

Referring to FIG. 4, the pellets 32 within the core section 12 of assembly 10 may be readily replaced by the 12-sided pellets 32', which in this embodiment, are formed of pressed and sintered zirconium alloy material which is unfueled. Each pellet is provided with six major outer surfaces 100', the pellets being, in reality, similar in cross section to pellets 32, but have their corners relieved, leaving the major surface areas 100 separated by the relieved portions 150. This in effect forms axial hydrogen gas passages 152 which are triangular in cross section and service all three laterally abutting pellets. A relatively large bore 102' is provided within each pellet, which receives a doughnut- or tubular-shaped fuel element 154. The doughnut shaped fuel element 154 is provided with a central bore 156 to receive a coolant tube 30' formed of an appropriate compatible material, such as zirconium, beryllium or molybdenum having inherently low hydrogen permeation rate. The tube 30' is preferably covered with an exterior, thin coating of glass or like ceramic material 104', to limit hydrogen permeation, which is in contact with the inner wall of the doughnut-shaped fuel element 154. This leaves a central opening 40' for the passage of coolant. The doughnut-shaped fuel element 154 may comprise a single element which extends longitudinally of the core assembly and is received by a plurality of abutting, axially aligned zirconium hydride pellets, or alternatively, each pellet may have its own doughnut-shaped ring of fuel. In the embodiment of FIG. 4, the coolant is circulated interiorly of the fuel and the fuel is in direct contact, that is, in conductive relationship to the zirconium hydride body 32'. Regardless of the configuration, there is always some communication between the fuel and its moderator through the neutrons and also the gamma rays which are given off by the fuel, and they deposit a certain amount of heat within the hydride material of the pellet, in proportion to the power level of the fuel. In general, it has been found that this amount of heat is too small to provide a very effective control process. The response, however, is better in the doughnut configuration of FIG. 4, since the concentration of fuel is lower spatially than it is in the type where the fuel is in the form of a rod passing through the center of the coolant passage. In the doughnut-type configuration of FIG. 4, the fuel temperature is more or less limited by the acceptable temperature of the hydride material.

Figure 5:
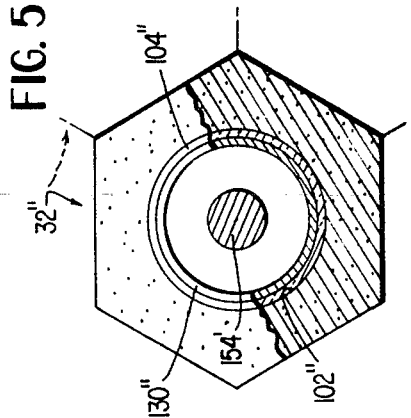
FIG. 5 is a plan view, partially in section of yet another form of a nuclear reactor core metal hydride pellet utilizing fuel in the form of a solid rod carried centrally of the pellet.

Turning to FIG. 5, there is shown another embodiment of the present invention, again employing abutting zirconium hydride pellets 32' which are hexagonal in cross-sectional configuration. The pellets, which form essentially the core of the reactor, are formed of a zirconium alloy or the like, being pressed and sintered by the processes set forth in the referred to application and are unfueled in like manner to the embodiment of FIG. 4. The pellets 32'' are bored at 102' and receive a coolant tube 130' of zirconium, beryllium or molybdenum, which again, is preferably coated with glass or like ceramic material 104''. Fuel material in the form of a rod 154' is centrally positioned within the coolant passage formed by the coolant tube 130''. Conventional fuels may be employed in all three embodiments, such as U–235, etc. Where the fuel is in rod form, both the fuel rod and the glass or ceramic coated coolant tubes 130'' extend axially of the complete core assembly, that is, they are unitary and associated with a plurality of physically abutting, axially aligned zirconium alloy pellets 32''. Of course, the individual pellets may be replaced by a unitary tubular member of wall embodiment, zirconium alloy depending upon the manufacturing technique, and reactor design parameters as long as the end products provide for the rapid movement of hydrogen through the zirconium alloy material.

The relatively small reactor provides a highly efficient heat source, modest fuel costs and when in the shutdown state, low radiological hazard and allows ready storability. While we have described the coolant as comprising a phosphorous sulphur liquid composition which vaporizes, passes to the thermal energy conversion section of the assembly, condenses and returns to the core section of the assembly by gravity, the coolant could take the form of a gas which is circulated by positive means, such as a pump to provide a system capable of operating in any orientation. In this case, a certain amount of hydrogen could be added to the coolant such that the hydrogen partial pressure within the coolant is equal to the hydrogen pressure within the "H-Rho" control system; that is, the hydrogen control pressure within the core proper and as such, would prevent the loss of hydrogen from the system. THe vapor pressures of the "H-Rho" control system are not very high and normally run from a 10th of an atmosphere to conceivably as high as 10 atmospheres in a space reactor. Thus, a gas-cooled reactor is highly feasible, using for example helium as the coolant gas where the pressure is on the order of 1,000 p.s.i. In such a system, the amount of hydrogen which would necessarily have to be added to the coolant to prevent a loss of hydrogen through leakage into the coolant would be very small. Indeed, if a small amount of hydrogen should leak out of the core into the coolant, a situation would soon be established where no further hydrogen leakage would occur because the hydrogen pressure within the coolant would be equal to the parital pressure of the hydrogen within the core, that is, within the hydride material.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A nuclear reactor of the passive metal hydride control type comprising:
   a core zone substantially filled with metal hydride material in operative relationship with nuclear fuel and having coolant passages passing therethrough;
   a metal tube within each passage and a liner intermediate said tube wall and the surrounding fuel or metal hydride material and having low permeability to hydrogen, low tensile strength and high compressive strength;
   a reservoir formed of metal hydride material;
   a fluid connection between said core zone and said reservoir whereby hydrogen can flow reversibly therebetween; and
   means for causing hydrogen to initially flow from said reservoir into said core zone to affect criticality.

2. The reactor of claim 1 wherein said fuel and metal hydride material is intimately mixed to form pellets.

3. The reactor of claim 1 wherein said fuel is in the form of doughnut-shaped elements positioned concentrically on said lined tube and intermediate said liner and said hydride material.

4. The reactor of claim 1 wherein said fuel is in the form of rod-shaped elements positioned within said coolant passages and spaced from said liner.

5. A core for a nuclear reactor of the passive metal hydride control type comprising:

metal hydride material substantially forming said core and defining its external dimension, said core including metal tubes defining coolant passages passing therethrough, nuclear fuel in operative relationship therewith and a liner on the external tube wall and between the hydride material and the metal tube, said liner comprising a material consisting of glass, ceramics or enamel having low hydrogen permeability, low tensile strength and high compressive strength.

6. The core of claim 5 wherein said fuel is intimately mixed with said metal hydride material.

7. The core of claim 5 wherein said nuclear fuel is positioned within said passages.

8. The core of claim 5 wherein said core is formed of a plurality of pellets comprising said metal hydride material each having a coolant passage passing therethrough.

9. The core of claim 5 wherein said liner material comprises glass.

10. A nuclear reactor of the passive metal hydride control type comprising: thermally isolated, first and second sealed containers, said first container carrying metal hydride and nuclear fuel material with said fueled metal hydride material forming essentially said reactor core, coolant passages carried by said metal hydride core material, said second container containing essentially only metal hydride material, means for circulating coolant through said first container, means for fluid connecting said sealed containers and means for heating said second container to control reactivity within said reactor core.

11. The reactor as claimed in claim 10 further including neutron reflector material carried by said first container and surrounding said metal hydride and nuclear fuel materials.

12. The reactor as claimed in claim 10 wherein said metal hydride material and said first container comprise a plurality of adjacent series of axially aligned, abutting apertured porous pellets.

13. The reactor as claimed in claim 12 wherein each pellet is hexagonal in cross-sectional configuration.

14. The reactor as claimed in claim 12 wherein each pellet is provided with small diameter passages for dispersing hydrogen therein, axially aligned with said pellet central aperture.

15. The reactor as claimed in claim 14 further including radial passages carried by each pellet along one end face thereof and intersecting with said axial hydrogen dispersion passages.

16. The reactor as claimed in claim 10 wherein said first container further includes axially extending coolant tubes carried by said first container and wherein said metal hydride material carried by said container comprises a plurality of abutting, apertured, porous pellets with said pellets being carried by said tubes.

17. The reactor as claimed in claim 16 wherein said coolant tubes are formed of one material of the group consisting of zirconium, beryllium and molybdenum.

18. The reactor as claimed in claim 17 wherein said metal coolant tubes have their outer periphery covered with a thin ceramic coating.

19. The reactor as claimed in claim 14 wherein said nuclear fuel comprises a doughnut-shaped tube positioned within the aperture of each pellet with the coolant passing through the center of said fuel tube.

20. The nuclear reactor as claimed in claim 19 further including a glass metal cooling tube carried by said axially aligned, abutting pellets centrally of said doughnut-shaped fuel tube.

21. The reactor as claimed in claim 16 wherein said nuclear fuel material comprises a solid fuel rod positioned centrally of said coolant tube.

* * * * *